(12) United States Patent
Bishop

(10) Patent No.: US 11,420,723 B2
(45) Date of Patent: Aug. 23, 2022

(54) AIRCRAFT WING AND WING TIP DEVICE

(71) Applicant: Airbus Operations Limited, Bristol (GB)

(72) Inventor: Benjamin Bishop, Bristol (GB)

(73) Assignee: Airbus Operations Limited, Bristol (GB)

( * ) Notice: Subject to any disclaimer, the term of this patent is extended or adjusted under 35 U.S.C. 154(b) by 471 days.

(21) Appl. No.: 16/421,792

(22) Filed: May 24, 2019

(65) Prior Publication Data

US 2019/0367153 A1 Dec. 5, 2019

(30) Foreign Application Priority Data

May 31, 2018 (GB) ...................................... 1808934

(51) Int. Cl.
*B64C 3/56* (2006.01)
(52) U.S. Cl.
CPC ...................................... *B64C 3/56* (2013.01)
(58) Field of Classification Search
CPC ......... B64C 23/072; B64C 3/546; B64C 3/56; B64C 23/52; B64C 23/48; B64C 23/065; B64C 3/38; B64C 3/40; B64C 5/08; F16C 2380/27; F16C 2361/61; F16C 33/581; Y02T 50/10; Y10T 403/32254
See application file for complete search history.

(56) References Cited

U.S. PATENT DOCUMENTS

| | | | | |
|---|---|---|---|---|
| 1,723,962 A | * | 8/1929 | Weymouth | B64C 3/56 244/49 |
| 1,928,336 A | * | 9/1933 | Kindelberger | B64C 3/56 244/49 |
| 2,021,324 A | * | 11/1935 | Osborn | B64C 3/56 244/49 |
| 2,166,564 A | * | 7/1939 | Pavlecka | B64C 3/56 244/49 |

(Continued)

FOREIGN PATENT DOCUMENTS

| | | |
|---|---|---|
| EP | 3 093 233 | 11/2016 |
| EP | 3 339 161 | 6/2018 |

(Continued)

OTHER PUBLICATIONS

European Search Report cited in 19177523.8 dated Oct. 24, 2019, 7 pages.

(Continued)

*Primary Examiner* — Medhat Badawi
(74) *Attorney, Agent, or Firm* — Nixon & Vanderhye P.C.

(57) ABSTRACT

An aircraft wing (1) including a fixed wing (3) and a wing tip device (4) at the tip of the fixed wing (3), the wing tip device (4) being rotatable relative to the fixed wing (3) between a flight configuration (4a) for use during flight, and a ground configuration (4b) for use during ground-based operations, in which ground configuration the wing tip device (4) is rotated relative to the fixed wing (3) such that the span of the wing (1) is reduced. The aircraft wing (1) has a gear assembly (31) that couples the wing tip device (4) to (Continued)

an actuator (30) such that the actuator (30) drives the rotation of the wing tip device (4) between the flight and ground configurations, the gear assembly (31) comprising a worm drive (32).

14 Claims, 12 Drawing Sheets

(56) References Cited

U.S. PATENT DOCUMENTS

| | | | | |
|---|---|---|---|---|
| 2,290,850 | A * | 7/1942 | Umschweif | B64C 3/56 244/49 |
| 2,375,423 | A * | 5/1945 | Lobelle | B64C 3/54 244/218 |
| 2,392,506 | A * | 1/1946 | Rossmann | B64C 3/56 244/49 |
| 2,418,301 | A * | 4/1947 | Heal | B64C 3/42 244/91 |
| 2,674,422 | A * | 4/1954 | Pellarini | B64C 3/56 244/49 |
| 2,712,421 | A * | 7/1955 | Naumann | B64C 3/56 244/49 |
| 2,961,196 | A * | 11/1960 | Atkinson | B64C 3/40 244/46 |
| 3,039,721 | A * | 6/1962 | Rogers, Jr. | B64D 37/04 244/135 R |
| 3,081,053 | A * | 3/1963 | Jarrell | B64C 3/56 244/49 |
| 3,439,890 | A * | 4/1969 | Stits | B64C 3/56 244/49 |
| 3,599,904 | A * | 8/1971 | Condit | B64C 3/38 244/38 |
| 3,647,163 | A * | 3/1972 | Swwwney | B64C 3/56 244/49 |
| 3,743,218 | A * | 7/1973 | Sweeney | B64C 3/42 244/36 |
| 4,022,403 | A * | 5/1977 | Chiquet | B61B 15/00 244/46 |
| 4,030,787 | A * | 6/1977 | Brogan | F16C 17/10 384/249 |
| 4,132,375 | A * | 1/1979 | Lamar | B64C 23/072 244/90 R |
| 4,336,914 | A * | 6/1982 | Thomson | F42B 10/20 244/3.27 |
| 4,667,898 | A * | 5/1987 | Greenhalgh | B64C 31/028 244/219 |
| 4,691,880 | A * | 9/1987 | Frank | F42B 10/16 244/49 |
| 4,717,093 | A * | 1/1988 | Rosenberger | F42B 10/16 244/49 |
| 4,778,129 | A * | 10/1988 | Byford | B64C 3/56 244/49 |
| 4,779,820 | A * | 10/1988 | Lambert | B64C 3/56 244/49 |
| 5,192,037 | A * | 3/1993 | Moorefield | B64C 3/56 244/3.28 |
| 5,201,479 | A * | 4/1993 | Renzelmann | B64C 3/56 244/49 |
| 5,310,138 | A * | 5/1994 | Fitzgibbon | B64C 3/56 244/49 |
| 5,350,135 | A * | 9/1994 | Renzelmann | B64C 3/56 244/49 |
| 5,372,336 | A * | 12/1994 | Paez | B64C 3/56 244/49 |
| 5,427,329 | A * | 6/1995 | Renzelmann | B64C 3/56 244/49 |
| 5,558,299 | A * | 9/1996 | Veile | B64C 3/56 244/49 |
| 5,671,899 | A * | 9/1997 | Nicholas | B64C 3/40 244/3.28 |
| 6,076,766 | A * | 6/2000 | Gruensfelder | B64C 3/56 244/130 |
| 6,260,798 | B1 * | 7/2001 | Casiez | B64C 39/024 244/49 |
| 6,260,799 | B1 * | 7/2001 | Russ | B64C 3/56 244/49 |
| 6,361,279 | B1 * | 3/2002 | Rodde | B64C 27/467 416/223 R |
| 6,446,906 | B1 * | 9/2002 | Voigt | B64C 9/36 244/3.27 |
| 6,497,600 | B1 * | 12/2002 | Levy | B64C 17/00 446/34 |
| 7,582,977 | B1 * | 9/2009 | Dehlsen | F03B 17/061 290/1 R |
| 7,811,151 | B2 * | 10/2010 | Conrad | A63H 27/02 446/62 |
| 8,419,362 | B2 * | 4/2013 | Bertolotti | F03D 7/0236 416/1 |
| 8,584,984 | B2 * | 11/2013 | Parks | B64C 3/56 244/49 |
| 8,651,431 | B1 * | 2/2014 | White | B64C 23/076 244/218 |
| 10,752,338 | B2 * | 8/2020 | Kelly | B64C 3/56 |
| 11,052,990 | B2 * | 7/2021 | Bishop | B64C 3/40 |
| 2003/0080243 | A1 * | 5/2003 | Hoisington | B60V 1/08 244/13 |
| 2004/0159227 | A1 * | 8/2004 | Richards | B64C 3/56 89/1.4 |
| 2005/0218260 | A1 * | 10/2005 | Corder | B64C 3/56 244/49 |
| 2007/0238571 | A1 * | 10/2007 | Sugitani | F16H 57/12 475/227 |
| 2010/0170995 | A1 * | 7/2010 | Maenz | B64C 1/26 244/131 |
| 2012/0014741 | A1 * | 1/2012 | Zamora Gomez | F16C 11/045 403/52 |
| 2012/0280080 | A1 * | 11/2012 | Lubenow | B64C 39/024 244/49 |
| 2012/0292436 | A1 * | 11/2012 | Karem | B64C 3/56 244/49 |
| 2013/0185970 | A1 * | 7/2013 | Oliver | E04H 12/18 40/606.14 |
| 2013/0341467 | A1 * | 12/2013 | Sakurai | B64C 3/56 244/201 |
| 2015/0192241 | A1 * | 7/2015 | Shannahan | F16M 11/041 248/178.1 |
| 2015/0336657 | A1 * | 11/2015 | Townsend | B64C 3/56 244/49 |
| 2015/0360774 | A1 * | 12/2015 | Covington | B64C 29/0033 244/7 R |
| 2016/0244145 | A1 * | 8/2016 | Thompson | B64C 23/072 |
| 2016/0244153 | A1 * | 8/2016 | McMahon | B64C 3/38 |
| 2016/0332721 | A1 * | 11/2016 | Hancock | B64C 3/56 |
| 2016/0332723 | A1 * | 11/2016 | Korya | B64C 3/56 |
| 2017/0029089 | A1 * | 2/2017 | Alexander | B64C 3/40 |
| 2017/0137110 | A1 * | 5/2017 | Harding | B64C 13/28 |
| 2017/0137111 | A1 * | 5/2017 | Harding | B64C 3/56 |
| 2017/0152016 | A1 * | 6/2017 | Napier | B64C 3/185 |
| 2017/0152017 | A1 * | 6/2017 | Good | B64C 3/56 |
| 2017/0190410 | A1 * | 7/2017 | Good | B64C 9/24 |
| 2017/0321804 | A1 * | 11/2017 | Soman | B64C 3/56 |
| 2017/0334543 | A1 * | 11/2017 | Wildman | B64C 23/072 |
| 2017/0355436 | A1 * | 12/2017 | Thompson | B64C 3/56 |
| 2017/0355437 | A1 * | 12/2017 | Bishop | B64C 23/072 |
| 2017/0355438 | A1 * | 12/2017 | Bishop | B64C 3/56 |
| 2017/0355440 | A1 * | 12/2017 | Bishop | B64C 3/56 |
| 2017/0355443 | A1 * | 12/2017 | Winkelmann | B64C 3/56 |
| 2017/0355444 | A1 * | 12/2017 | Lorenz | B64C 3/56 |
| 2017/0369151 | A1 * | 12/2017 | Thompson | B64C 3/56 |
| 2018/0033343 | A1 * | 2/2018 | Oliver | G09F 7/20 |
| 2018/0170519 | A1 * | 6/2018 | Brakes | F16F 7/08 |
| 2019/0031363 | A1 * | 1/2019 | Hoisington | B64D 35/02 |
| 2019/0161162 | A1 * | 5/2019 | Bishop | B64C 3/42 |
| 2019/0283859 | A1 * | 9/2019 | Bishop | B64C 3/26 |

(56) References Cited

U.S. PATENT DOCUMENTS

2019/0367153 A1* 12/2019 Bishop .................. B64C 23/072
2020/0140059 A1* 5/2020 Bishop ...................... B64C 3/28

FOREIGN PATENT DOCUMENTS

FR        1 320 450      3/1963
WO    2011/051699    5/2011

OTHER PUBLICATIONS

Combined Search and Examination Report for GB 1808934.2 dated Nov. 28, 2018, 8 pages.

* cited by examiner

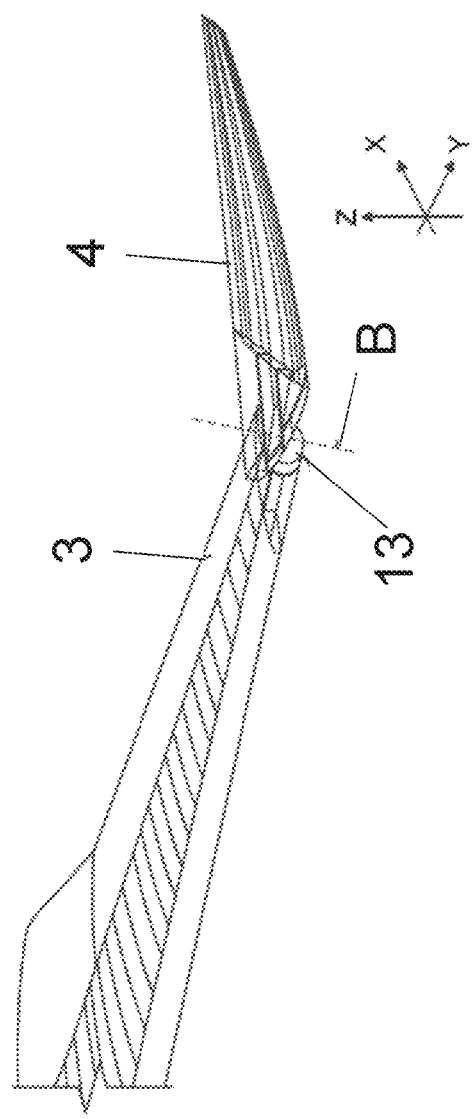

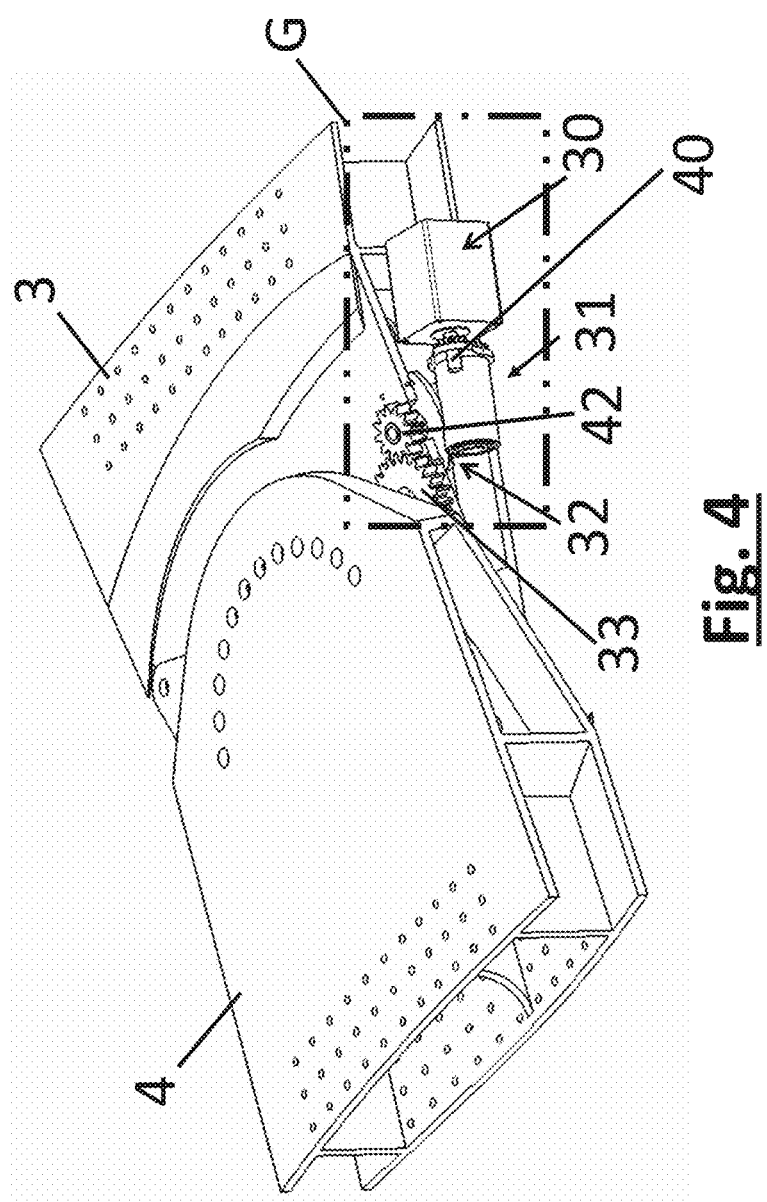

AIRCRAFT WING AND WING TIP DEVICE

RELATED APPLICATION

This application claims priority to United Kingdom Patent Application GB 1808934.2 filed May 31, 2018, the entirety of which is incorporated by reference.

BACKGROUND OF THE INVENTION

The present invention relates to aircraft comprising foldable wings, and to foldable wings for use on such aircraft.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs aircraft are provided with wings which may have wing tip devices that are foldable to reduce the span of the aircraft on the ground (compared to when the aircraft is configured for flight). However such folding wings are relatively complex to design and build and present a number of design obstacles, in particular in relation to how the wing tip device is coupled to an actuator to move it between the folded and unfolded positions.

The present invention seeks to address or mitigate at least some of the above mentioned problems. Alternatively, or additionally, the present invention seeks to provide an improved aircraft wing that comprises a wing tip device that is rotatable relative to the fixed wing. Alternatively, or additionally, the present invention seeks to provide an improved aircraft with a wing tip device that is rotatable relative to the fixed wing. Alternatively, or additionally, the present invention seeks to provide an improved method of changing the configuration of an aircraft wing, with a rotatable wing tip device, between flight and ground configurations.

SUMMARY OF THE INVENTION

According to a first aspect of the invention there is provided an aircraft wing comprising a fixed wing and a wing tip device at the tip of the fixed wing, the wing tip device being rotatable relative to the fixed wing between: a flight configuration for use during flight, and a ground configuration for use during ground-based operations, in which ground configuration the wing tip device is rotated relative to the fixed wing such that the span of the wing is reduced, wherein the aircraft wing comprises a gear assembly coupling the wing tip device to an actuator such that the actuator drives the rotation of the wing tip device between the flight and ground configurations and wherein the gear assembly comprises a worm drive.

This may allow for greater flexibility in the arrangement of the gear assembly, including greater flexibility in the arrangement of the orientation of the gears of the gear assembly, which is particularly advantageous when used to couple a wing tip device to an actuator, as the space to accommodate such a gear assembly is limited. Furthermore the movement of a wing tip device, as it rotates between the flight and ground configurations, can be relatively complex. The use of the worm drive may allow for a relatively simple gear assembly (discussed further below).

Optionally the wing tip device is rotatably coupled to the fixed wing by a rotational joint comprising a follower rotationally fixed relative to the wing tip device and a guide rotationally fixed relative to the fixed wing such that as the wing tip device rotates, the follower is rotated relative to the guide.

Optionally the follower comprises a first ring and the guide comprises a second ring, the first and second rings being concentric. Preferably the follower is located radially outwardly of the guide. Alternatively the follower may be located radially inwardly of the guide.

The rotational joint may comprise a slew ring. In this respect, one of the first and second rings may form an inner race and the other of the first and second rings may form an outer race.

The follower or guide may comprise a toothed rack that forms part of the gear assembly. Preferably the follower comprises the toothed rack.

Optionally the toothed rack couples the wing tip device to the worm drive. In embodiments of the invention the toothed rack couples the wing tip device to an output gear of the worm drive.

Optionally the worm drive comprises an input gear configured to rotate about an input axis and an output gear configured to rotate about an output axis. In embodiments of the invention the input gear and output gear mesh with each other such that rotation of the input gear rotates the output gear (and vice-versa).

The worm drive may comprise a worm and a worm gear. It will be appreciated that a worm is a gear in the form of a screw and a worm gear is a toothed gear wheel that engages with the worm. In this respect, the teeth of the worm gear mesh with the screw of the worm such that rotation of the worm rotates the worm gear (and vice-versa).

In embodiments of the invention the worm comprises a screw thread, preferably an external screw thread. Preferably the screw thread is helical.

Preferably the worm is the input gear and the worm gear is the output gear. Alternatively, the worm gear may be the input gear and the worm may be the output gear.

The rack may be coupled to the output gear of the worm drive via at least one intermediate gear. In this respect, the rack may be coupled to the output gear of the worm drive via at least one idler gear.

This is advantageous in that it may allow for greater freedom in the positioning of the output gear of the worm drive. In this respect, it may allow the worm drive to be positioned further inboard (i.e. towards the root of the aircraft wing) and further aft (i.e. towards the trailing edge of the aircraft wing), where there is typically more space to accommodate a worm drive.

It will be appreciated that an idler gear is a gear that is located between two or more gears (e.g. gear wheel, rack, etc.) and couples the gears (by meshing with them). The idler gear may provide a spacing between the gears that it couples together, thereby allowing for a reduction in the size of one or more of the gears (that it couples together).

The idler gear may be located between, and mesh with, a gear mounted on an output shaft of the worm drive so as to rotate with the output shaft, and the rack.

Alternatively the worm of the worm drive may mesh with the rack. In this case, the rack may form an output gear of the worm drive, i.e. the worm drive may comprise the worm and the rack, with the worm forming the input gear of the worm drive and the rack comprising the output gear of the worm drive It will also be appreciated that, in this case, the rack forms the worm gear (and may have any of the described features of the worm gear).

Preferably the input and output axes are oriented relative to each other at an obtuse angle.

Preferably the obtuse angle is greater than or equal to 95° and less than or equal to 105°, more preferably greater than or equal to 100° and less than or equal to 105°.

In embodiments of the invention the input and output axes are oriented relative to each other at an obtuse angle when viewed along a direction perpendicular to a plane that is parallel to both the input and output axes. It will be appreciated that it is the projections of input and output axes in the plane that form the obtuse angle. In this respect the output axis is inclined outwardly, away from the normal to the input axis. The output axis is inclined such that the direction along the output axis, from the intersection of the input and output axes towards the follower, has a component in the direction along the input axis away from the end of the input shaft that is proximal to the actuator.

Preferably the output axis is substantially parallel to the axis of rotation of the wing tip device.

This may allow subsequent gears in the gear assembly (i.e. the gears of the gear assembly between the output gear of the worm drive and the wing tip device) to have a relatively simple arrangement, for example rotational axes that are substantially parallel to the rotational axis of the wing tip device, thereby providing a relatively simple meshing arrangement between each of these gears.

Preferably the gears in the gear assembly between the output gear of the worm drive and the wing tip device each have a rotational axis that is substantially parallel to the rotational axis of the wing tip device.

The worm gear preferably comprises helical teeth.

Optionally the actuator comprises an output shaft that rotates about an axis and is coupled to the input gear of the worm drive to rotate the input gear about an input axis, and wherein the axis of the output shaft of the actuator is offset from the axis of the input gear of the worm drive.

This is advantageous in that it may provide greater flexibility over where the actuator can be positioned. In addition, one or more gears coupling the output shaft of the actuator to the input gear of the worm provide may provide an additional gear reduction.

Preferably the output shaft of the actuator is coupled to the input gear of the worm drive via a gearing arrangement. In this respect, preferably a gear wheel is mounted on the output shaft of the actuator that meshes with a gear wheel that is coupled to the input gear of the worm drive such that rotation of the actuator rotates the input gear of the gear wheel. The input gear of the worm drive may be rotationally fixed relative to said gear wheel.

Preferably the axis of the output shaft of the actuator is parallel to the input axis of the worm drive.

The wing tip device is rotatable between the flight and ground configurations, about an axis of rotation. The orientation of the axis is preferably such that when the wing tip device is rotated about the axis, from the flight configuration to the ground configuration, the span of the aircraft wing is reduced.

Optionally the wing tip device and the fixed wing are separated along an oblique cut plane passing through the upper and lower surfaces of the wing, the oblique cut plane being orientated normal to the axis of rotation of the wing tip device.

The axis of rotation is orientated normal to a primary cut plane. The primary cut plane is preferably oblique. The cut plane preferably extends through the upper and lower surfaces of the wing. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The primary cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing. The primary cut plane will be readily identifiable to the skilled person. The primary cut plane may be the plane within which the wing tip device rotates. Some embodiments of the invention may comprise a bearing, such as a slew ring, for supporting rotation of the wing tip device. The bearing may be co-axial with the rotational axis. The primary cut plane may extend through the thickness of the bearing, and typically through the mid-thickness of the bearing (i.e. the mid-thickness of the bearing is co-planar with the primary cut plane).

The axis of rotation may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to) a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chord wise direction; the lateral direction may be a span wise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing. In all cases, the cut plane/axis is orientated such that the span of the wing is reduced when the wing tip device is rotated about the axis. The determination of fore and aft of the axis of rotation may be by reference to a boundary defined by an axis perpendicular to the longitudinal axis of the aircraft and intersecting the axis of rotation. All points towards the front of the aircraft relative to the boundary may be considered fore of the rotational axis and all points to the rear of the aircraft relative to the boundary may be considered aft of the rotational axis. Alternatively, the fore and aft locations may be determined in a frame of reference local to the wing. The boundary may be aligned intersecting the axis of rotation and parallel to the leading edge of the wing. The aircraft wing may comprise a spar running in an approximately span-wise direction, and the boundary may be aligned intersecting the axis of rotation and parallel to the spar.

The wing tip device is preferably rotatable about a single axis of rotation. For example, the rotation of the wing tip device is preferably not the result of a compound rotation (I.e. a net rotation created by a plurality of separate rotations about separate axes).

The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

According to a second aspect of the invention there is provided an aircraft wing comprising a fixed wing and a wing tip device at the tip of the fixed wing, the wing tip device being rotatable relative to the fixed wing, between a flight configuration for use during flight and a ground configuration for use during ground-based operations, in which ground configuration the wing tip device is rotated relative to the fixed wing such that the span of the wing is reduced, the wing tip device being rotatably coupled to the fixed wing, by a slew-ring, the aircraft wing comprising a gear assembly that couples the wing tip device to an actuator such that the actuator drives the rotation of the wing tip device between the flight and ground configurations, wherein the gear assembly comprises a worm drive, the worm drive having an output gear configured to rotate about an axis that is that is substantially parallel to the rotational axis of the wing tip device.

The aircraft wing of the second aspect of the invention may have any of the features of the aircraft wing of the first aspect of the invention.

According to a third aspect of the invention there is provided an aircraft comprising an aircraft wing according to the first or second aspects of the invention.

According to a fourth aspect of the invention there is provided a kit of parts of an aircraft wing, the kit of parts comprising a fixed wing and a wing tip device configured for attachment to the tip of the fixed wing such that the wing tip device is rotatable relative to the fixed wing between a flight configuration for use during flight, and a ground configuration for use during ground-based operations, in which ground configuration the wing tip device is rotated relative to the fixed wing such that the span of the wing is reduced, wherein the kit of parts further comprises an actuator and a gear assembly for coupling the wing tip device to the actuator such that the actuator drives the rotation of the wing tip device between the flight and ground configurations and wherein the gear assembly comprises a worm drive.

According to a fifth aspect of the invention there is provided a method of changing the configuration of an aircraft wing, the aircraft wing comprising a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced, wherein a gear assembly couples the wing tip device to an actuator such that the actuator drives the rotation of the wing tip device between the flight and ground configurations and wherein the gear assembly comprises a worm drive and the method comprises rotating the wing tip device between the flight and ground configurations using the actuator.

The aircraft wing in the method of the fifth aspect of the invention may have any of the features of the aircraft wing of the preceding aspects of the invention.

Optionally the aircraft and/or the rotational joint is arranged such that the majority of the aerodynamic and inertial loads on the wing tip device during use of the aircraft, are transferred to the fixed wing, via the rotational joint. Optionally substantially all the aerodynamic and inertial loads on the wing tip device during use of the aircraft, are transferred to the fixed wing, via the rotational joint.

The wing tip device and the fixed wing may be separated along an oblique cut plane passing through the upper and lower surfaces of the wing, the oblique cut plane being orientated normal to the axis of rotation of the wing tip device. The oblique plane and the axis of rotation may be such that the fixed wing and the wing tip device do not clash when rotating between the flight and ground configurations. An example of a wing tip device that is rotatable in this manner is shown in WO 2015/150835. Embodiments of the present invention have been found to be especially effective in relation to this type of moveable wing tip device because of the limited internal space accessible during assembly.

The orientation of the axis of rotation of the wing tip device is preferably such that when the wing tip device is rotated about the rotational axis, from the flight configuration to the ground configuration, the span of the aircraft wing is reduced.

The cut plane is oblique. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The oblique cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing.

The axis of rotation may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to) a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chord wise direction; the lateral direction may be a span wise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing.

The wing tip device is preferably rotatable about a single axis of rotation. For example, the rotation of the wing tip device is preferably not the result of a compound rotation (i.e. a net rotation created by a plurality of separate rotations about separate axes).

The angle is preferably an oblique angle. The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft, etc.). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises 70%, 80%, 90%, or more, of the overall span of the aircraft wing.

When the wing tip device is in the ground configuration, the aircraft incorporating the wing, may be unsuitable for flight. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft may be any air vehicle such as a manned aircraft or a UAV. More preferably the aircraft is a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

DESCRIPTION OF THE DRAWINGS

Embodiments of the present invention will now be described by way of example only with reference to the accompanying drawings of which:

FIG. 3b shows a view corresponding to that of FIG. 4a, but where the wing tip device is rotating towards the ground configuration;

FIG. 4 shows a perspective view of the region of the rotational joint that couples the wing tip device to the fixed wing;

DETAILED DESCRIPTION

Figure 1A:
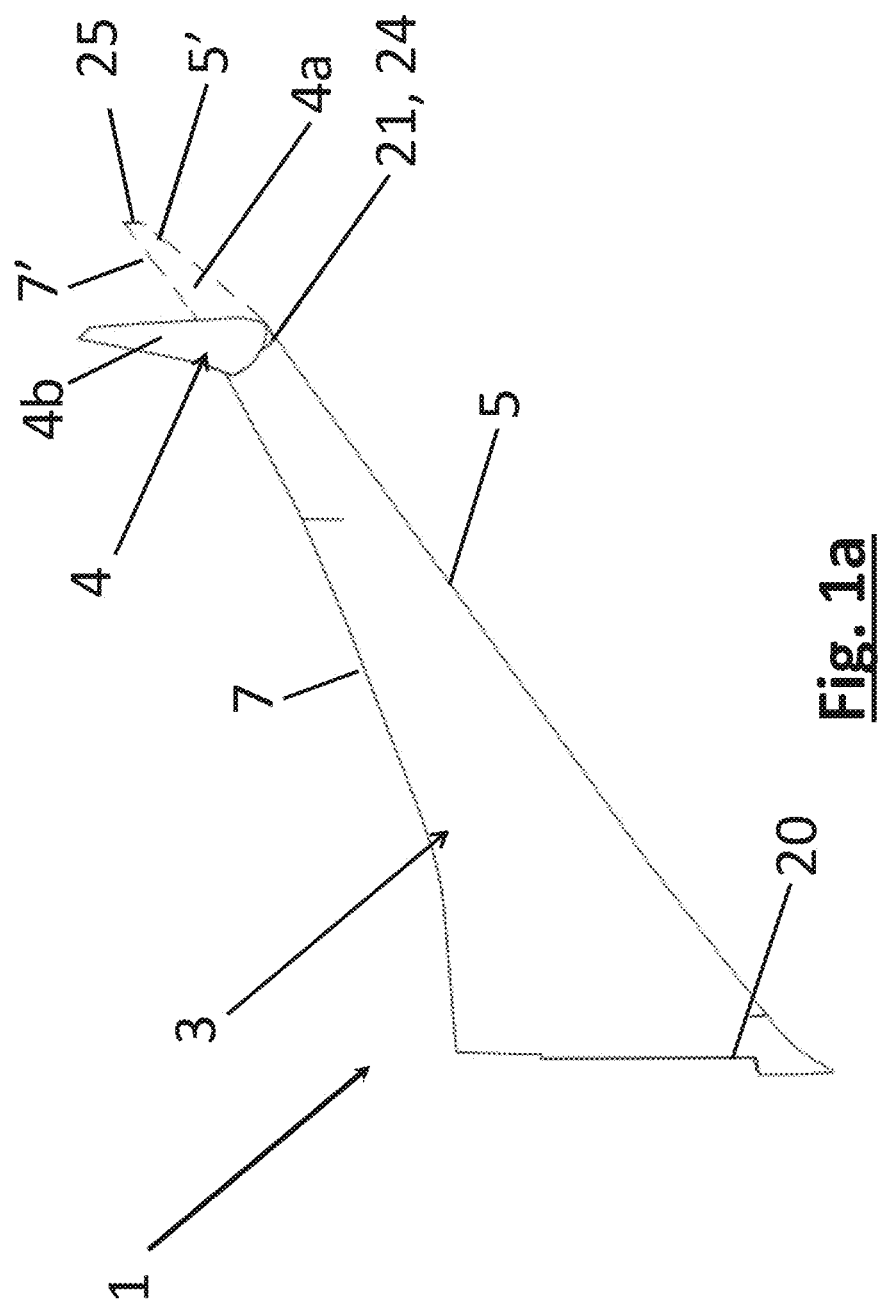
FIG. 1a shows a perspective view of a swept wing of a passenger aircraft according to a first embodiment of the invention, where a wing tip device of the wing is shown in a flight configuration (shown as a dotted line) and in a ground configuration (shown as a solid line)
Figure 1B:
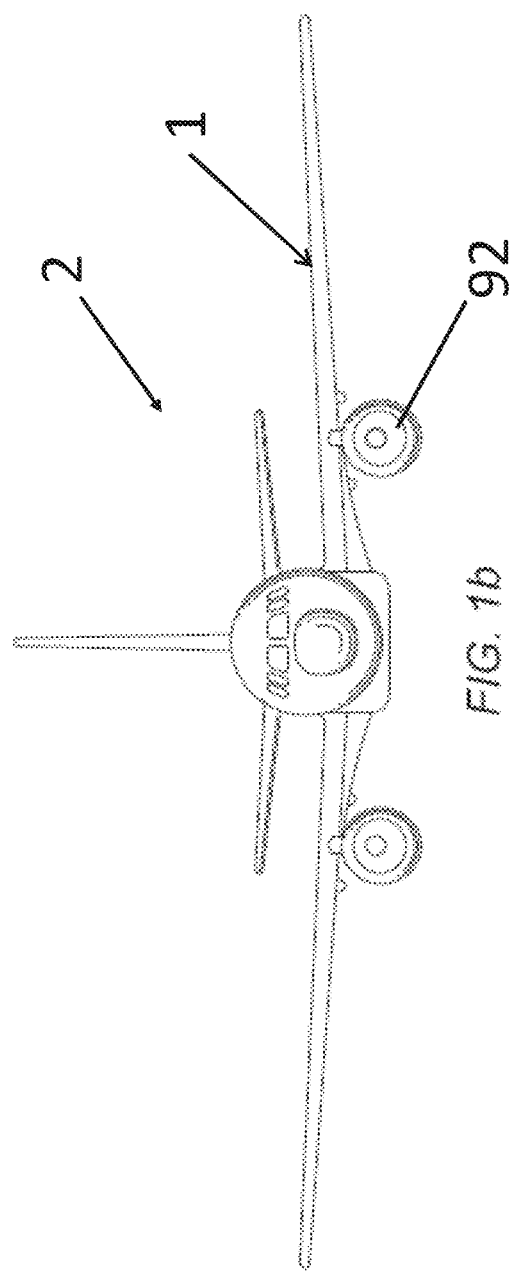
FIG. 1b shows a front view of the passenger aircraft, where the wing tip device is in the flight configuration.

FIG. 1a is a perspective view of an aircraft wing 1 of an aircraft 2 according to a first embodiment of the invention. The aircraft wing 1 comprises a fixed wing 3 and a wing tip device 4.

The aircraft 2 is a passenger aircraft comprising a passenger cabin comprising a plurality of rows and columns of seat units for accommodating a multiplicity of passengers, in this case more than 50 passengers. The aircraft has a pair of the wings 1. The aircraft is a powered aircraft and comprises engines 92, mounted under the wings 1, for propelling the aircraft 2.

The fixed wing 3 extends outboard from the fuselage of the aircraft, in a span wise direction from a root 20 to a tip 21. The fixed wing 3 also extends in a chord-wise direction from a leading edge 5 to a trailing edge 7.

The wing tip device 4 is located at the outboard tip 21 of the fixed wing 3. In the described embodiment the wing tip device 4 is in the form of a planar wing tip extension, although the invention is also applicable to other types of wing tip device (e.g. a non-planar wing tip device, such as a winglet).

The wing tip device 4 is moveable between a flight configuration 4a (shown as a dotted line in FIG. 1a) and a ground configuration 4b (shown as a solid line in FIG. 1a). When the wing tip device 4 is in the flight configuration it extends outboard in a span wise direction, from an inboard end 24, located at the tip 21 of the fixed wing 3, to a tip 25. The wing tip device 4 also extends in a chord-wise direction from a leading edge 5' to a trailing edge 7'.

In the flight configuration, the leading and trailing edges 5', 7' of the wing tip device 4 are continuations of the leading and trailing edges 5, 7 of the fixed wing 3. Furthermore, the upper and lower surfaces of the wing tip device 4 device are continuations of the upper and lower surfaces of the fixed wing 3. Thus, there is a smooth transition from the fixed wing 3 to the wing tip device 4.

It will be appreciated that there may be a smooth transition, even where there are changes in sweep or twist at the junction between the fixed wing 3 and wing tip device 4. However, there are preferably no discontinuities at the junction between the fixed wing 3 and wing tip device 4.

The wing tip device 4 is placed in the flight configuration for flight. In the flight configuration the wing tip device 4 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage). In this regard, in the flight configuration the span may exceed an airport compatibility gate limit. Thus the wing tip device 4 is moveable to a ground configuration for use when the aircraft is on the ground.

In the ground configuration 4b the wing tip device 4 is folded, from the above-mentioned flight configuration, such that the wing tip device 4 rotates rearwards (aft), sweeping in an arc. When the wing tip device 4 is in the ground configuration, the span of the wing 1 is reduced (as compared to when the wing tip device 4 is in the flight configuration) and the aircraft 2 thus complies with the above-mentioned airport clearances etc. In this regard, in the ground configuration the span may be reduced such that the span (with the wing tip device in the ground configuration) is less than, or substantially equal to, the airport compatibility gate limit.

When the wing tip device 4 is in the ground configuration, the aircraft 2 incorporating the wing 1 is unsuitable for flight. The aircraft 2 is configured such that, during flight, the wing tip device 4 is not moveable to the ground configuration. The aircraft 2 comprises a sensor for sensing when the aircraft 2 is in flight. When the sensor senses that the aircraft 2 is in flight, a control system is arranged to disable the possibility of moving the wing tip device 4 to the ground configuration.

Figure 2:
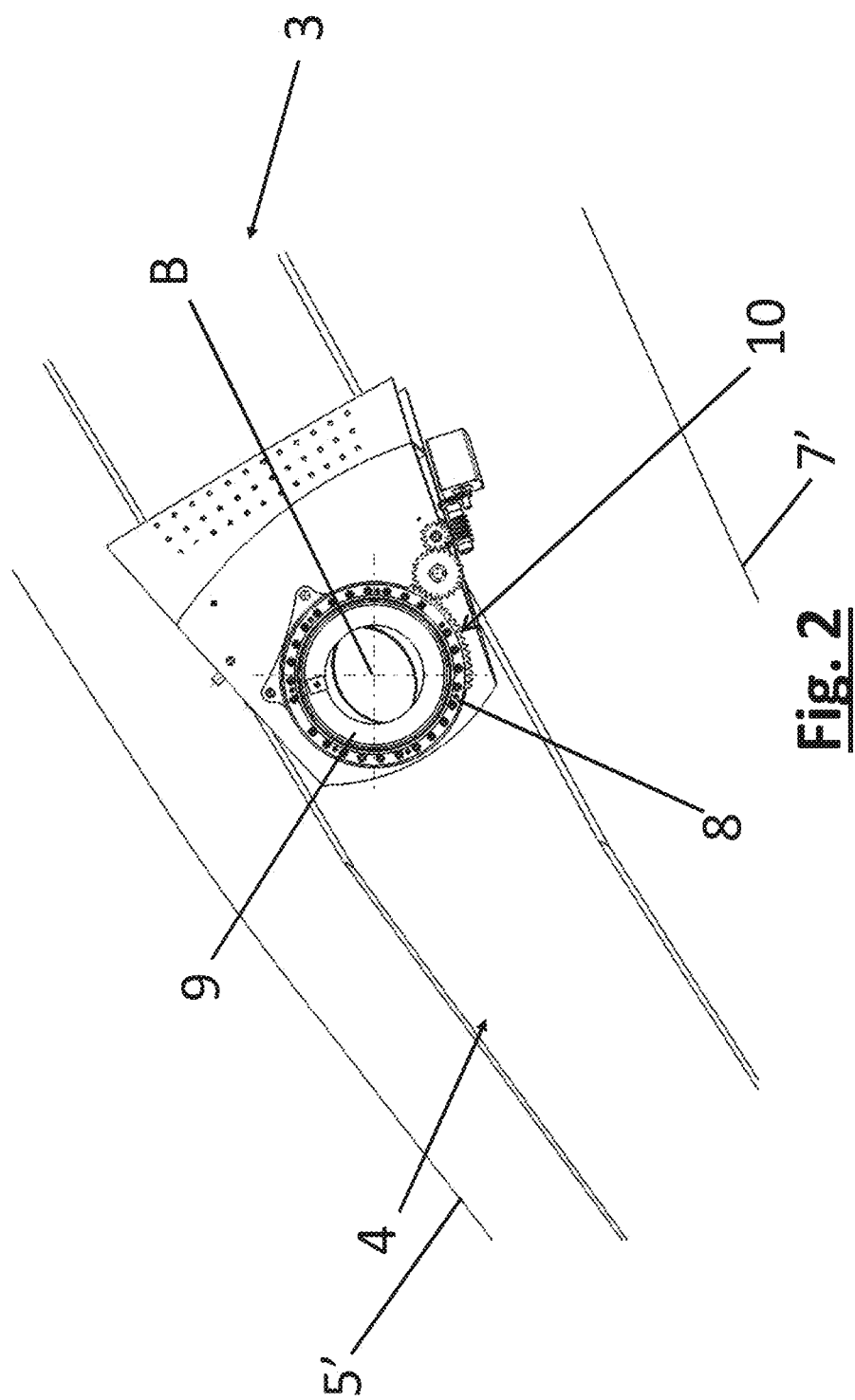
FIG. 2 shows a plan view of an end region of the wing of FIG. 1a, when the wing tip device is in the flight configuration, showing a rotational joint of the aircraft wing, and where parts of the wing skin of the wing tip device and of the fixed wing are omitted for illustrative purposes.

Referring to FIG. 2, the aircraft wing 1 comprises a rotational joint 10. The rotational joint 10 rotatably couples the wing tip device 4 to the fixed wing 3, to allow the wing tip device 4 to rotate between the flight and ground configurations 4a, 4b about a rotational axis B.

Figure 3A:
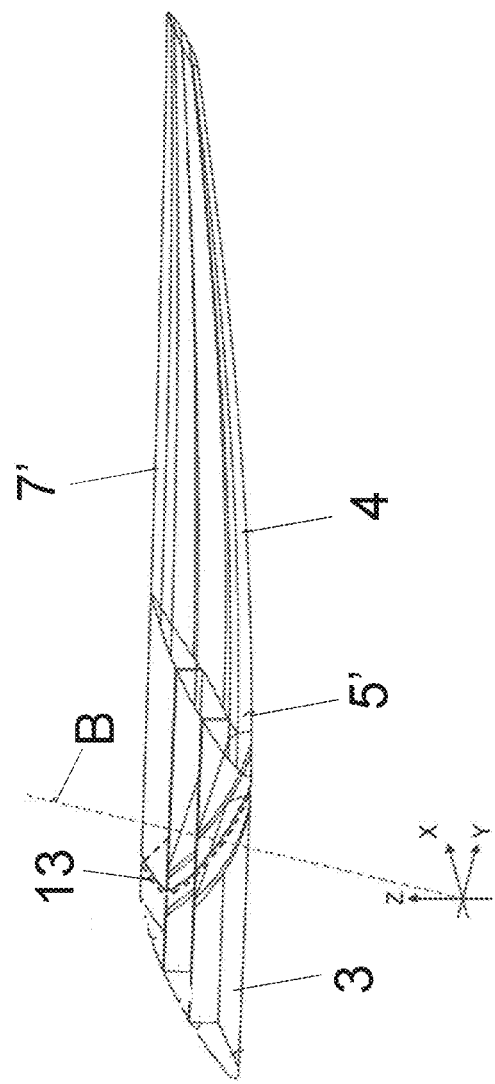
FIG. 3a shows a perspective schematic view (with the upper skins omitted to showing some of the internal structure of the wing and wing tip device) of the aircraft wing shown in FIGS. 1 to 3, where the wing tip device is in the flight configuration.

Referring to FIGS. 3a and 3b, to achieve the above-mentioned movement, the wing tip device 4 and the fixed wing 3 are separated along an oblique cut plane 13 passing through the upper and lower surfaces of the wing 1. The rotational axis B of the wing tip device 4 extends in a direction perpendicular to the oblique cut plane 13. The rotational axis B is orientated at an acute angle to all three mutually perpendicular axes X, Y and Z (i.e. chordwise, spanwise and vertical).

The oblique plane 13 and the rotational axis B are such that the fixed wing 3 and the wing tip device 4 do not clash when the wing tip device 4 rotates between the flight and ground configurations. An example of a wing tip device 4 that is rotatable in this manner is shown in WO 2015/150835, the contents of which are herein incorporated by reference.

The aircraft 2 is arranged such that substantially all the aerodynamic and inertial loads on the wing tip device 4 during use of the aircraft, are transferred to the fixed wing 3, via the rotational joint 10.

The rotational joint 10 is in the form of a slew ring, comprising an outer race 8 and an inner race 9 (see FIG. 2). Each of the inner and outer races 9, 8 are substantially circular rings. The inner race 9 is concentrically mounted within the outer race 8 and the outer race 8 is arranged to rotate around the inner race 9.

The inner race 9 is integral with the fixed wing 3, such that the inner race 9 is rotationally fixed relative to the fixed wing 3.

The outer race 8 is rotationally fixed to the wing tip device 4 such that the wing tip device 4 rotates with the outer race 8, between the flight and ground configurations, about the rotational axis B. In this regard, the outer race 8 is attached to an inboard rib of the wing tip device 4.

The inner race 9 is nested within the outer race 8 and is concentric with the outer race 8. In this regard, the outer race 8 and the inner race 9 are both centred on the rotational axis B of the wing tip device 4.

The outer race 8 is arranged to rotate around the rotational axis B. A bearing element, in the form of a steel cylindrical ring (not shown) provided with a low friction polymer coating, is provided between the inner and outer races 9, 8, i.e. between the radially outer surface of the inner race 9 and the radially inner surface of the outer race 8, to support the rotation of the outer race 8 about the inner race 9. In this respect, the outer race 8 acts a follower and the inner race 9 acts as a guide, to guide the rotation of the outer race 8. It will be appreciated that any suitable bearing arrangement may be used.

The aircraft wing 1 further comprises a prime mover 30 and a gear assembly 31 that couples the prime mover 30 to the wing tip device 4 so as to rotate the wing tip device 4 between the flight and ground configurations 4a, 4b.

In more detail, the prime mover 30 is an actuator in the form of an electric motor 30. The electric motor 30 is configured to drive an output shaft 40 about a rotational axis A (see FIG. 5).

An actuator output gear, in the form of a toothed gear wheel 41 is mounted on the output shaft 40, and is rotationally fixed to the shaft, so as to rotate with the shaft 40.

Figure 5:
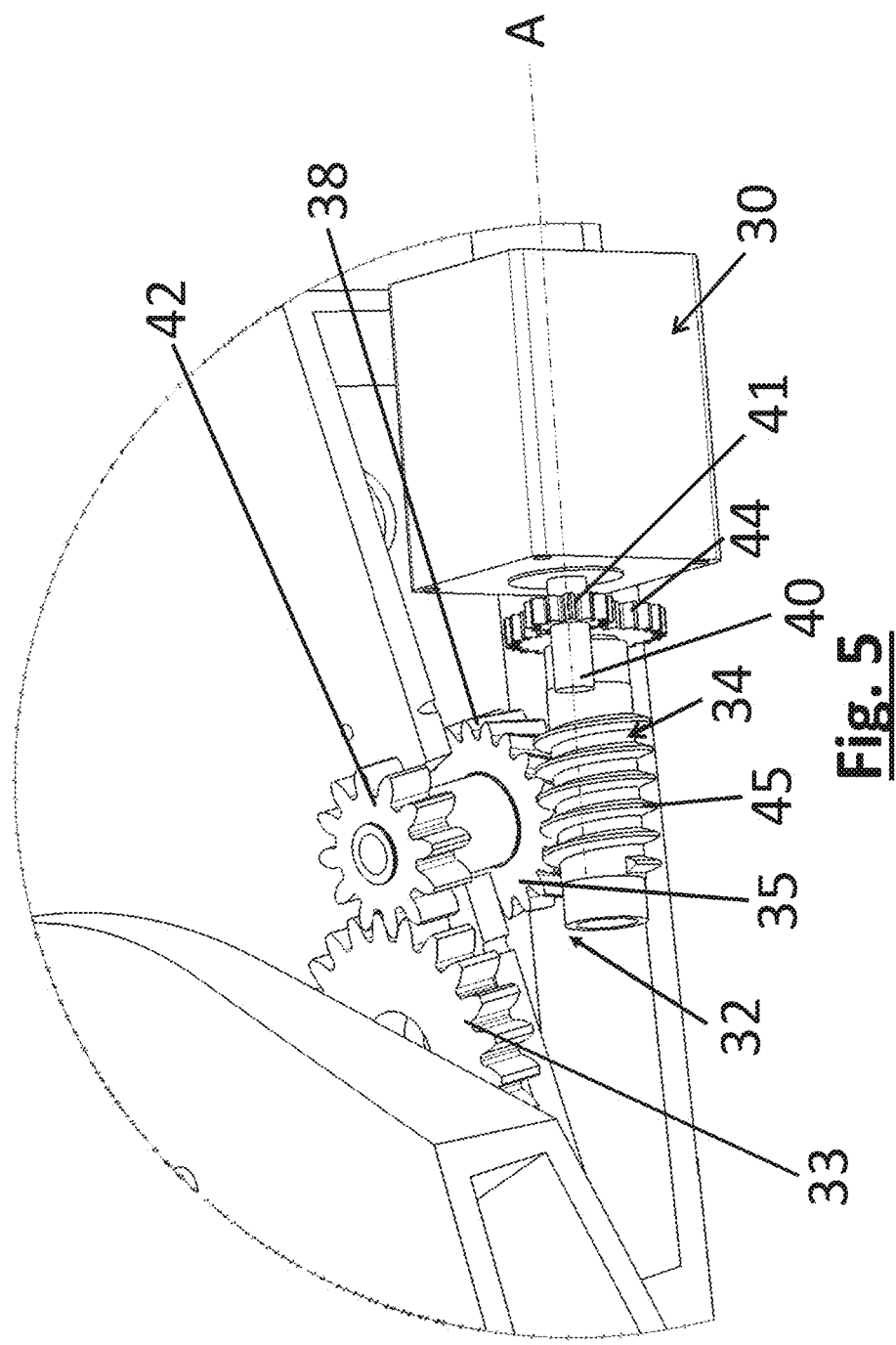
FIG. 5 shows an enlarged view of region G of FIG. 4, where a casing of the worm drive is omitted for illustrative purposes.
Figure 6:
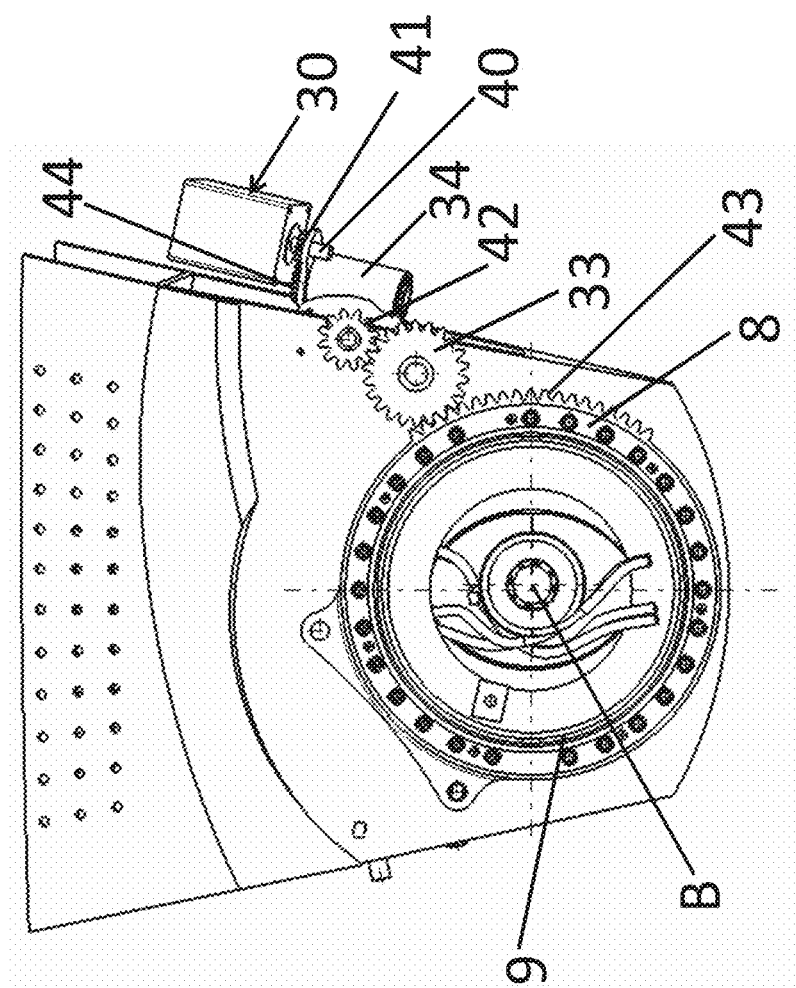
FIG. 6 is a view taken along the rotational axis of the wing tip device, of part of the rotational joint of the aircraft wing shown in FIGS. 1 to 5, as well as of an actuator and gear assembly of the aircraft wing.
Figure 8:
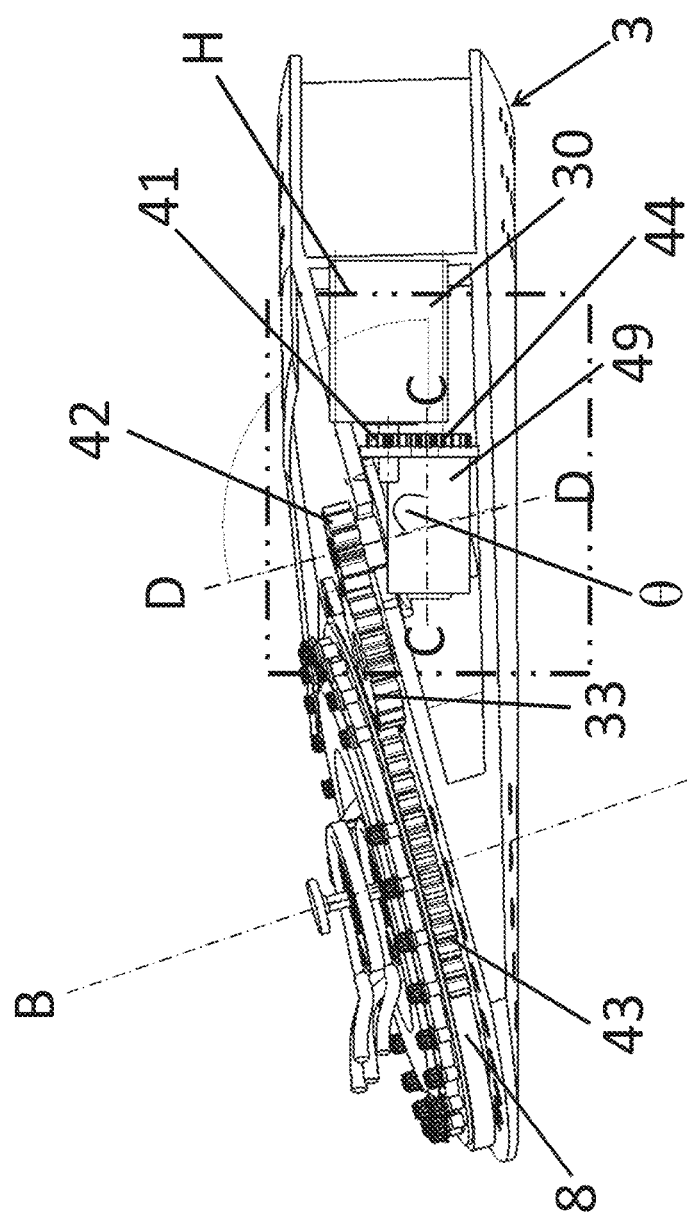
FIG. 8 shows a side view of the part of the rotational joint, actuator and gear assembly of the aircraft wing shown in FIGS. 6 and 7.

A worm drive 32 comprises an input gear in the form of a worm 34 (see FIG. 8) and an output gear in the form of a worm gear 35 (see FIG. 5). The worm 34 and worm gear 35 are housed in a casing 49 that is fixed to the outer casing of the motor 31. In this respect, the casing 49 is rotationally fixed. The electric motor 30 and gear assembly 31 are mounted to the fixed wing 3.

The worm 34 is a gear in the form of a screw provided with an external helical screw thread 45.

The worm gear 35 is in the form of a toothed gear wheel, provided with helical teeth 38 distributed around its periphery. The teeth 38 of the worm gear 35 mesh with the screw thread of the worm 34 such that the rotation of the worm 34 rotates the worm gear 35 (and vice-versa).

A coupling gear 44, in the form of a toothed gear wheel, meshes with the actuator output gear wheel 41. The coupling gear 44 is fixed to an end of the worm 34 such that rotation of the coupling gear 44 by the prime mover 30 (via the actuator output gear wheel 41), rotates the worm 34 about a rotational axis C (on the fixed shaft 50), which will be referred to as an input axis C (see FIG. 8).

Figure 7:
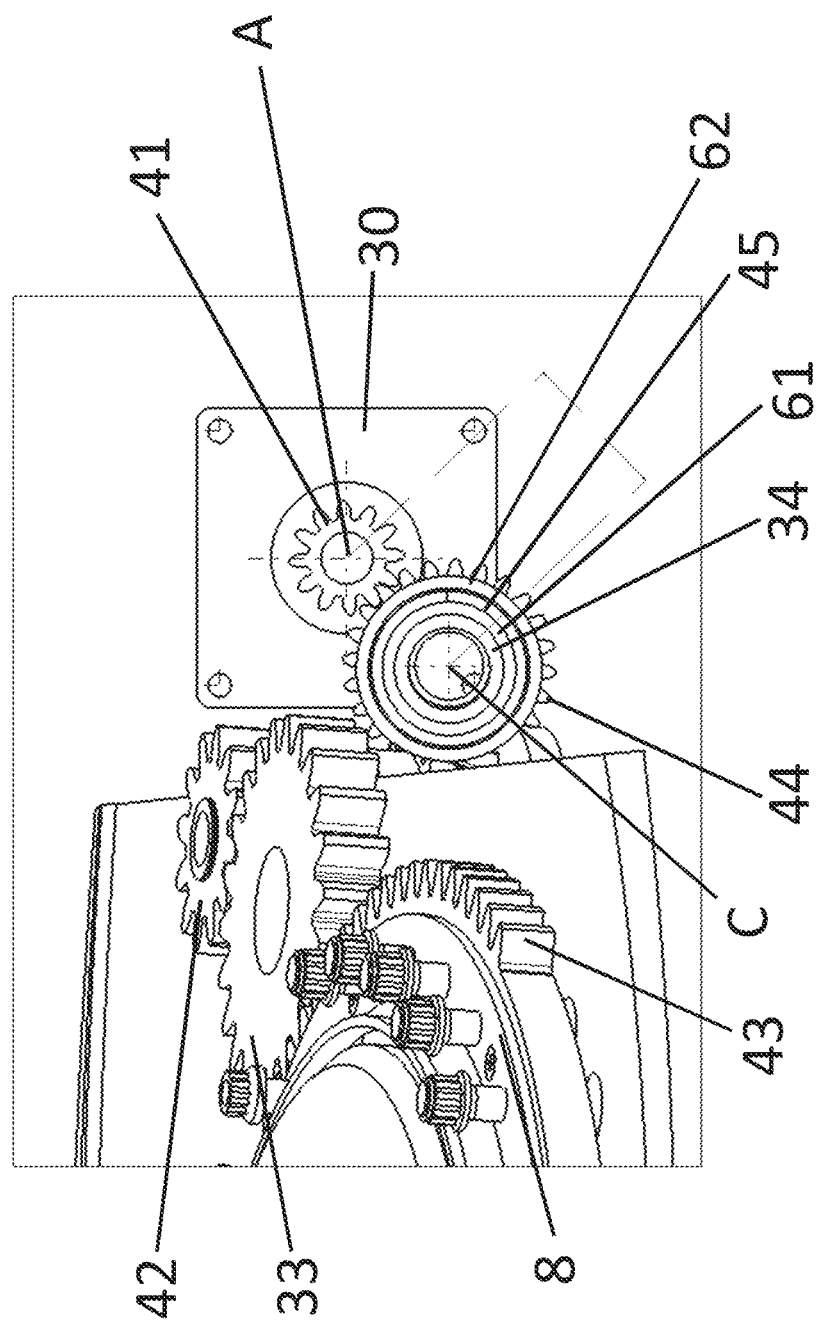
FIG. 7 is a view taken along the axis of the output shaft of the motor, of the part of the rotational joint, actuator and gear assembly of the aircraft wing shown in FIG. 6.

The worm 34 is rotatably mounted in the casing by first and second bearing assemblies provided at opposite axial ends of the worm 34. FIG. 7 shows a cross-sectional view of the second bearing assembly. The first bearing assembly is not shown in the Figures, but it will be appreciated that it is identical to the second bearing assembly, but provided at the opposite axial end of the worm 34, i.e. adjacent to the coupling gear 44). Each bearing assembly comprises an inner race 61 and an outer race 62 with a plurality of rolling bearing elements (not shown) provided between them. The inner race 61 is rotationally fixed to the worm (i.e. to the cylindrical external surface of the worm 34 on which the helical screw thread 45 is mounted) and the outer race 62 is rotationally fixed to the radially inner surface of the casing 49.

Figure 9:
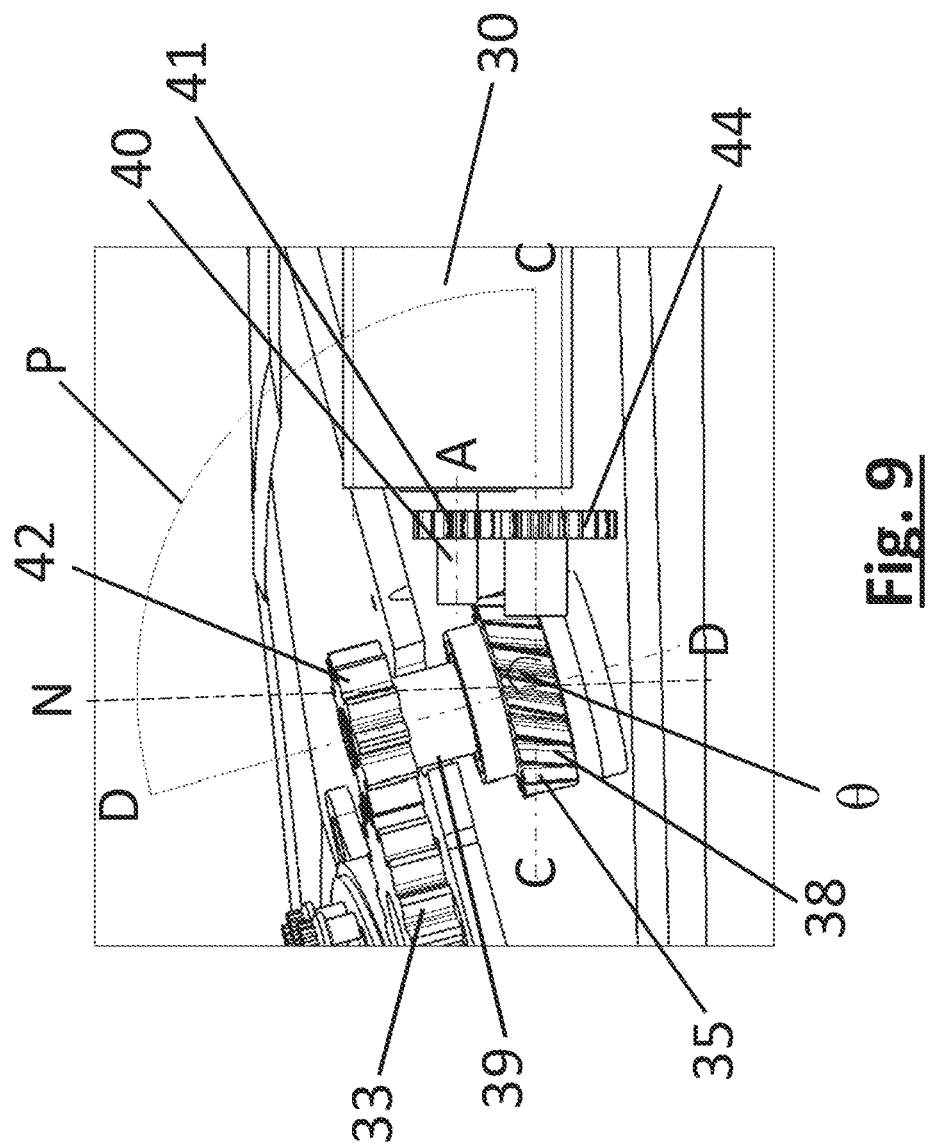
FIG. 9 shows an enlarged view of region H in FIG. 8, with the worm of the worm drive omitted for illustrative purposes, and FIGS. 10a to 10c each show a perspective view of parts of the rotational joint of an aircraft wing according to second, third and fourth embodiments of the invention respectively.

The input axis C and the rotational axis A of the output shaft 40 of the electric motor 30 are substantially parallel to each other (see FIG. 9). Furthermore, the input axis C and the rotational axis A of the output shaft 40 of the prime mover 30 are offset from each other, i.e. they are not co-axial with each other. In this respect, the use of the actuator output gear wheel 41 and coupling gear 44 allows the input axis C of the worm drive 32 to be offset from the output shaft 40 of the electric motor 30.

This is advantageous in that it provides greater flexibility over where the electric motor 30 can be positioned (e.g. relatively far aft). In addition, it provides an additional gear reduction (between the electric motor 31 and the wing tip device 4).

The worm gear 35 is fixedly mounted on an output shaft 39 (of the worm drive 32), such that the worm gear 35 and the output shaft 39 rotate about an axis D, which will be referred to as an output axis D.

Accordingly the worm 34 engages with the worm gear 35 such that the rotation of the worm 34 (about the input axis C) rotates the worm gear 35 (about the output axis D).

Unlike in a conventional worm drive (in which the input and output axes are perpendicular to each other), the input axis C and output axis D are inclined relative to each other at an obtuse angle (θ).

In this respect, the input and output axes C, D are oriented relative to each other at an obtuse angle (θ) when viewed along a direction perpendicular to a plane P that is parallel to both the input and output axes C, D (see FIG. 9). It will be appreciated that it is the projections of input and output axes in the plane P that form the obtuse angle (θ). The output axis D is inclined outboard (i.e. towards the tip of the wing tip device 4 when in the flight configuration), away from the normal N to the input axis C.

In this respect, the output axis D is inclined from the normal N such that the direction along the output axis D from the intersection of the input and output axes C, D, towards the outer race 8 has a component in the direction along the input axis C away from the end of the worm 34 provided with the coupling gear 44.

In the currently described embodiment the obtuse angle (θ) is 102.5°.

The output axis D is substantially parallel to the axis of rotation B of the wing tip device 4. This may allow subsequent gears in the gear assembly 31 (i.e. the gears of the gear assembly 31 between the worm gear 35 and the wing tip device 4) to have a relatively simple arrangement. In this respect, it allows the gear wheel 42, the idler gear 33 and the rack 43 (see below) to have rotational axes that are each substantially parallel to the rotational axis B of the wing tip device 4, thereby providing a relatively simple meshing arrangement between each of these gears.

In order to accommodate the obtuse orientation of the output axis D, the teeth 38 of the worm gear 35 are helical (see FIG. 9), i.e. they each describe the shape of part of a helix extending about the rotational axis of the worm gear 35.

A toothed gear wheel 42 is fixedly mounted on the output shaft 39 of the worm drive 32, at an opposite end to the worm gear 35, so as to rotate with the output shaft 39.

A section of the outer circumference of the outer race 8 is provided with a plurality of teeth, distributed in the circumferential direction, to form a rack 43.

An idler gear 33, is in the form of a toothed gear wheel, is mounted on a rotatable shaft to rotate about an axis. The idler gear 33 is provided between the rack 43 and the gear wheel 42 and its teeth engage those of the rack 43 and of the gear wheel 42 so as to rotatably couple them together.

The idler gear 33 is advantageous in that is allows for greater freedom in the positioning of the output shaft 39 of the worm drive 32. In this respect, it allows the worm drive 32 to be positioned further inboard and further aft, where there is typically more room to accommodate it.

Accordingly the electric motor 30 is coupled to the outer race 8, to rotate the outer race 8, by a gear assembly 31, which comprises the actuator output gear wheel 41, the coupling gear 44, the worm 34, the worm gear 35, the gear wheel 42, the idler gear 33 and the rack 43.

In this respect, the rotation of the electric motor 30 rotates the actuator output gear wheel 41, which rotates the coupling gear 44, which rotates the worm 34, which rotates the worm gear 35, which rotates the gear wheel 42, which rotates the idler gear 33, which rotates the rack 43.

Since the outer race 8 is fixed to the inboard rib 34 of the wing tip device 4, this in turn rotates the wing tip device 4 between the flight and ground configurations 4a, 4b, about the rotational axis B. The electric motor 30 and gear assembly 31 is arranged to rotate the outer race 8 in both rotational directions about the axis B (i.e. both clockwise and anti-clockwise), so as to rotate the wing tip device 4 from the flight configuration to the ground configuration and from the ground configuration to the flight configuration.

The gear assembly 31 is a reduction transmission. In this regard, the gear assembly 31 is configured to convert a high speed low torque input, from the electric motor 30, into a low speed high torque to the wing tip device 4 (it will be appreciated that the terms 'high' and 'low' are being used relative to each other). The transmission 31 has an input to output gear ratio of 292.4:1, i.e. the electric motor 31 has to rotate 292.4 times to rotate the outer race 8 one full revolution. Conversely, for every one revolution of the electric motor 31, the outer race 8 rotates 0.00342 of a rotation, which equates to 1.23°.

The rotational joint 10 further comprises a locking mechanism assembly (not shown) configured to selectively lock the rotational joint 10 such that the wing tip device 4 is locked in the flight configuration or the ground configuration 4a, 4b.

Figure 10B:
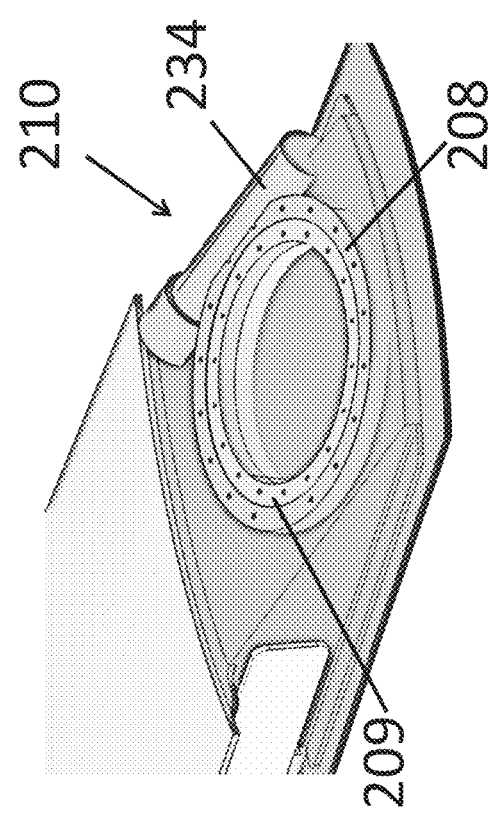
Figure 10C:
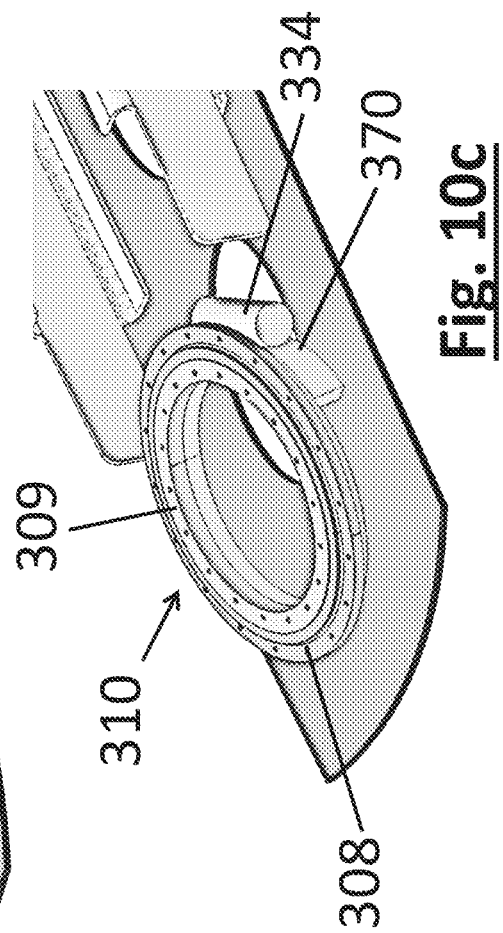
Figure 10A:
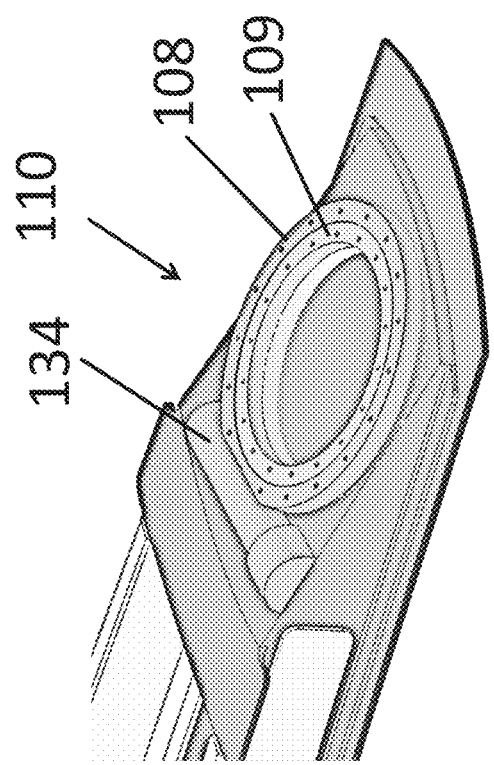

Referring to FIG. 10a there is shown a part of a rotational joint 110, of an aircraft wing, according to a second embodiment of the invention. The second embodiment of the invention is the same as the first embodiment of the invention, except for the differences described below. Corresponding features are given corresponding reference numerals, incremented by 100.

The aircraft wing (and rotational joint 110) of the second embodiment is identical to that of the first embodiment, except in that the worm 134 engages directly with the rack (not visible in FIG. 10a) of the outer race 108, so as to rotate the outer race 108 (between the flight and ground configurations) with respect to the inner race 109. In this case, the worm 134 forms the input gear of the worm drive and the rack forms the output gear of the worm drive.

In this respect, in this embodiment the worm gear 135, output shaft 139, gear wheel 142 and idler gear 133 are not present, with the teeth of the worm 134 instead engaging directly with the teeth of the rack.

FIG. 10b shows a part of a rotational joint 210, of an aircraft wing, according to a third embodiment of the invention. The third embodiment of the invention is the same as the second embodiment of the invention, except for the differences described below. Corresponding features are given corresponding reference numerals, incremented by 100 (relative to those of the second embodiment).

The third embodiment of the invention is the same as the second embodiment of the invention, except in that the worm 234 and the rack are located at a different circumferential position (about the rotational axis B) to in the second embodiment, such that the worm 234 rotates the outer race 208 with respect to the inner race 209.

Referring to FIG. 10c there is shown a part of a rotational joint 310, of an aircraft wing, according to a fourth embodiment of the invention. The fourth embodiment of the invention is the same as the second embodiment of the invention, except for the differences described below. Corresponding features are given corresponding reference numerals, incremented by 200 (relative to those of the second embodiment).

The aircraft wing (and rotational joint 310) of the fourth embodiment is identical to that of the second embodiment, except in that the inner race 309 is rotationally fixed relative to the wing tip device, such that it rotates with the tip device, and the outer race 308 is fixed to the fixed wing. Accordingly, in this embodiment the inner race 309 acts a follower and the outer race 308 acts as a guide, to guide the rotation of the inner race 309.

The toothed rack (not shown) is provided on an annular flange 370 that extends axially from the inner race 309, below the lower surface of the outer race 308.

The worm 334 engages directly with the rack, as in the second and third embodiments. However, in this embodiment, this rotates the inner race 309 in order to rotate the wing tip device.

Whilst the present invention has been described and illustrated with reference to particular embodiments, it will be appreciated by those of ordinary skill in the art that the invention lends itself to many different variations not specifically illustrated herein.

For example, in the described embodiments the worm is the input gear and the worm gear is the output gear. Alternatively, the worm gear may be the input gear and the worm may be the output gear.

In the described embodiments the rack is provided on the follower, i.e. the race that rotates with the wing tip device. Alternatively the rack may be provided on the guide, i.e. the race that is rotationally fixed relative to the fixed wing. In this case, the electric motor 30 and the gears of the gear assembly 31 between the electric motor 30 and the rack 43 would be mounted in the wing tip device 4. The rotation of the electric motor 31 would cause the worm drive 32, the electric motor 30 and the gears of the gear assembly 31 between the electric motor 30 and the rack 43, to rotate around the rack 43 (which is rotationally fixed to the fixed wing 3), thereby rotating the wing tip device 4 about the rotational axis B between the flight and ground configurations. Such an arrangement may be used in relation to any of the described embodiments.

In the described embodiments the wing tip device is a planar tip extension. In other embodiments, the wing tip device may comprise, or consist of, a non-planar device, such as a winglet.

In the described embodiments the prime mover 30 is an actuator in the form of an electric motor 30. It will be appreciated that any suitable actuator may be used, including a hydraulic or pneumatic actuator, for example.

The aircraft may be any type of aircraft, including any air vehicle, such as a manned aircraft or a UAV. However, the aircraft is preferably a passenger aircraft.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. Where 'or' is used in the foregoing description, this it to be taken to mean 'and/or'.

The invention claimed is:

1. An aircraft wing comprising a fixed wing and a wing tip device at a tip of the fixed wing, the wing tip device is rotatable relative to the fixed wing between:
   a flight configuration for use during flight, and
   a ground configuration for use during ground-based operations, in which ground configuration the wing tip device is rotated relative to the fixed wing such that a span of the wing is reduced,
   wherein the aircraft wing comprises a gear assembly coupling the wing tip device to an actuator such that the actuator drives rotation of the wing tip device between the flight and ground configurations,
   wherein the gear assembly comprises a worm drive including worm gear configured to rotate about an input axis and a worm gear configured to rotate about an output axis, and the input axis is obtuse to the output axis, wherein the worm gear is driven by the worm, and wherein the worm gear comprises helical teeth and the helical teeth each form a portion of a helix extending around the output axis.

2. The aircraft wing according to claim 1, wherein the wing tip device is rotatably coupled to the fixed wing by a rotational joint comprising a follower rotationally fixed relative to the wing tip device and a guide rotationally fixed relative to the fixed wing such that as the wing tip device rotates, the follower is rotated relative to the guide, and wherein the follower or guide comprises a toothed rack that forms part of the gear assembly.

3. The aircraft wing according to claim 2, wherein the follower comprises the toothed rack.

4. The aircraft wing according to claim 2, wherein the toothed rack is coupled to the worm gear of the worm drive via an intermediate gear.

5. The aircraft wing according to claim 2, wherein the worm gear meshes with the toothed rack.

6. The aircraft wing according to claim 1, wherein the output axis is substantially parallel to an axis of rotation of the wing tip device.

7. The aircraft wing according to claim 1, wherein the actuator comprises an output shaft that rotates about a rotational axis and is coupled to the worm of the worm drive to rotate the worm about an input axis, and wherein the rotational axis of the output shaft of the actuator is offset from the input axis of the worm of the worm drive.

8. The aircraft wing according to claim 1, wherein the wing tip device and the fixed wing arc separated along an oblique cut plane passing through the upper and lower surfaces of the wing, the oblique cut plane is orientated normal to an axis of rotation of the wing tip device.

9. An aircraft wing comprising a fixed wing and a wing tip device at a tip of the fixed wing, the wing tip device is rotatable relative to the fixed wing between:
   a flight configuration for use during flight, and
   a ground configuration for use during ground-based operations, in which ground configuration the wing tip device is rotated relative to the fixed wing such that a span of the wing is reduced,
   the wing tip device is rotatably coupled to the fixed wing by a slew-ring,
the aircraft wing comprising a gear assembly that couples the wing tip device to an actuator such that the actuator drives the rotation of the wing tip device between the flight and ground configurations,
   wherein the gear assembly comprises a worm drive includes a worm and worm gear driven by the worm;
   wherein the worm is configured to rotate about an input axis parallel to a rotational axis of the wing tip device;
   wherein the worm gear is configured to rotate about an output axis obtuse to the input axis, and wherein the worm gear comprises helical teeth each forming a portion of a helix extending around the output axis.

10. The aircraft wing according to claim 1, wherein the wing tip device is a wing tip extension.

11. An aircraft comprising the aircraft wing according to claim 1.

12. A kit of parts of an aircraft wing, the kit of parts comprising a fixed wing and a wing tip device configured for attachment to a tip of the fixed wing such that the wing tip device is rotatable relative to the fixed wing between:
   a flight configuration for use during flight, and
   a ground configuration for use during ground-based operations, in which ground configuration the wing tip device is rotated relative to the fixed wing such that a span of the wing is reduced,
wherein the kit of parts further
comprises:
   an actuator, and
   a gear assembly configured to couple the wing tip device to the actuator such that the actuator drives the rotation of the wing tip device between the flight and ground configurations,
   wherein the gear assembly comprises a worm drive including an worm configured to rotate about an input axis and worm gear driven by the worm and configured to rotate about an output axis obtuse to the input axis, and
   wherein the worm gear comprises helical teeth, and each of the teeth is shaped as a partial helix extending around the output axis.

13. A method of changing the configuration of an aircraft wing, the aircraft wing comprising a fixed wing and a wing tip device at a tip of the fixed wing, the wing tip device is rotatable relative to the fixed wing between:
   a flight configuration for use during flight, and
   a ground configuration for use during ground-based operations, in which ground configuration the wing tip device is rotated relative to the fixed wing such that a span of the wing is reduced,
   wherein a gear assembly couples the wing tip device to an actuator such that the actuator drives the rotation of the wing tip device between the flight and ground configurations, and
   wherein the gear assembly comprises a worm drive including worm configured to rotate about an input axis and a worm gear driven by the worm and configured to rotate about an output axis obtuse to the input axis and wherein the worm gear comprises helical teeth each forming a partial helix around the output axis, and
   the method comprises rotating the wing tip device between the flight and ground configurations using the actuator, wherein the wing tip device rotates about an axis parallel to the output axis.

14. The aircraft wing according to claim 1, wherein the output axis is parallel to a rotational axis of the wing tip device.

* * * * *